United States Patent [19]

Ng

[11] Patent Number: 4,949,135
[45] Date of Patent: Aug. 14, 1990

[54] VISUAL BASED PROCESS CONTROL APPARATUS WHICH IS BASED ON A NEAR UNIFORM HUMAN VISUAL RESPONSE SPACE

[75] Inventor: Yee S. Ng, Fairport, N.Y.

[73] Assignee: Eastman Kodak Company, Rochester, N.Y.

[21] Appl. No.: 394,902

[22] Filed: Aug. 17, 1989

[51] Int. Cl.$^5$ ............................................. G03G 15/01
[52] U.S. Cl. .................................. 355/327; 355/246; 355/204
[58] Field of Search ............... 355/214, 204, 246, 208, 355/210, 77, 88, 326, 327; 340/701, 703; 346/157; 358/76, 80

[56] References Cited

U.S. PATENT DOCUMENTS

| | | |
|---|---|---|
| 3,799,668 | 3/1974 | McVeigh . |
| 4,058,828 | 11/1977 | Ladd . |
| 4,068,940 | 1/1978 | Bobbe . |
| 4,159,174 | 6/1979 | Rising . |
| 4,310,237 | 1/1982 | Gengelbach ........................ 355/214 |
| 4,350,435 | 9/1982 | Fiske et al. ........................ 355/246 |
| 4,385,823 | 5/1983 | Kasper et al. . |
| 4,451,137 | 5/1984 | Farley ................................. 355/246 |
| 4,843,573 | 6/1989 | Taylor et al. .................... 340/701 X |

FOREIGN PATENT DOCUMENTS 0084228 7/1983 European Pat. Off. .
0080350 4/1985 European Pat. Off. .
0144188 6/1985 European Pat. Off. .

OTHER PUBLICATIONS

Hunt, Dr. R. W. G., "The Reproduction of Color", Uniform Color Spaces, (4th Edition, Van Nostrand Reinhold, 1987), pp. 114-123.

Primary Examiner—A. T. Grimley
Assistant Examiner—William J. Royer
Attorney, Agent, or Firm—Milton S. Sales

[57] ABSTRACT

While the human eye does not respond linearly to density and luminance changes, it does respond linearly to lightness L*. Equal increments on the L* scale do represent approximately equal steps in the perceived lightness of related colors. Near uniform color scales are available wherein equal differences in the color co-ordinates correspond to roughly equal visual differences. Accordingly, the disclosure relates to a visual-based process control method for copiers and printers which is based on a near uniform human visual response space rather than a density space. This gives a better control on the average for minimizing error in the human visual space than if the density space is used.

21 Claims, 8 Drawing Sheets

| $D_{ref}$ (black) | $dL^*/dD_{ref}$ | RELATIVE WEIGHTING FACTOR |
|---|---|---|
| 0 | 89.00 | 1.000 |
| 0.2 | 76.36 | 0.858 |
| 0.4 | 65.50 | 0.736 |
| 0.6 | 56.18 | 0.631 |
| 1.0 | 41.13 | 0.464 |
| 1.6 | 26.07 | 0.293 |

| $D_{ref}$ (black) | $dL^*/dD_{ref}$ | RELATIVE WEIGHTING FACTOR |
|---|---|---|
| 0.08 | 83.7 | 1.000 |
| 0.25 | 73.5 | 0.956 |
| 0.45 | 63.0 | 0.753 |
| 0.70 | 52.0 | 0.621 |
| 1.00 | 41.3 | 0.493 |
| 1.35 | 31.6 | 0.377 |
| 1.85 | 21.5 | 0.257 |

| STEP # | VISUAL | CYAN | MAGENTA | YELLOW | $L^*$ | $a^*$ | $b^*$ |
|---|---|---|---|---|---|---|---|
| 0 | 0.09 | 0.09 | 0.08 | 0.08 | 93.20 | -0.35 | 2.04 |
| 2 | 0.10 | 0.11 | 0.09 | 0.08 | 92.50 | -1.58 | 1.28 |
| 5 | 0.14 | 0.18 | 0.11 | 0.09 | 90.06 | -5.88 | -1.37 |
| 9 | 0.23 | 0.33 | 0.15 | 0.12 | 84.60 | -14.96 | -7.04 |
| 12 | 0.28 | 0.42 | 0.18 | 0.14 | 81.12 | -20.30 | -10.43 |
| 16 | 0.38 | 0.61 | 0.23 | 0.17 | 76.20 | -27.18 | -14.56 |
| 19 | 0.40 | 0.64 | 0.24 | 0.18 | 75.47 | -28.06 | -15.11 |
| 23 | 0.47 | 0.80 | 0.28 | 0.21 | 71.78 | -32.46 | -17.78 |
| 26 | 0.52 | 0.89 | 0.31 | 0.23 | 70.04 | -34.58 | -18.99 |
| 30 | 0.58 | 1.04 | 0.34 | 0.26 | 67.47 | -37.44 | -20.70 |
| 33 | 0.62 | 1.12 | 0.37 | 0.27 | 66.23 | -38.70 | -21.50 |
| 37 | 0.68 | 1.25 | 0.40 | 0.30 | 64.31 | -40.39 | -22.51 |
| 40 | 0.72 | 1.35 | 0.42 | 0.32 | 62.65 | -41.53 | -23.18 |
| 44 | 0.84 | 1.66 | 0.54 | 0.50 | 57.90 | -42.60 | -24.20 |

*FIG. 13*

| $D_{ref}$ (cyan) | $dE^*/dD_{ref}$ | WEIGHTING FACTOR |
|---|---|---|
| 0 | 80.20 | 1.000 |
| 0.2 | 80.10 | 0.999 |
| 0.4 | 65.50 | 0.817 |
| 0.6 | 46.40 | 0.579 |
| 1.0 | 28.60 | 0.357 |
| 1.6 | 16.05 | 0.200 |

VISUAL BASED PROCESS CONTROL APPARATUS WHICH IS BASED ON A NEAR UNIFORM HUMAN VISUAL RESPONSE SPACE

BACKGROUND OF THE INVENTION

1. Technical Field

This invention relates generally to a visual based process control apparatus and method for electrostatographic copiers and/or printers.

2. Background Art

In electrophotographic copying and printing a color original document, several factors inhibit perfect and constant color reproduction in terms of color balance, color fidelity, and tone reproduction. These factors include variation in the color and intensity of the light source used to illuminate the document, variation in the spectral reflectance of the different colorants of the document, non-ideal color separation filters, variation in the photoresponse of the photoconductor, variation in the toning contrast in the different color development stations, variations in the transfer or fusing efficiencies, and unwanted absorptions in the colored toners.

Prior art systems attempt to diminish the adverse effects of these factors using manual or automatic setup systems, or a combination of both. In typical manual setup systems, a skilled operator examines the output reproduction (copy or print) and the corresponding input and output density ($D_{in}$-$D_{out}$) curves for red, green, blue, and black. Based on experience with the equipment, the operator determines adjustments to process control parameters, such as initial voltage $V_O$, exposure $E_O$, and development bias $V_b$. Several iterations of adjustment may be required to achieve acceptable color reproductions, in terms of color balance, color fidelity, and tone reproduction.

The setup procedure is complicated by the fact that a process control parameter adjustment which is favorable to one region of the reproduction may be detrimental for another. For example, a particular color may be too dark at high density levels and too light at low density levels. Accordingly, an adjustment to lighten the color to correct for high density errors would compound the low density error.

During setup, a skilled operator will generally image a neutral density step tablet and adjust the process for hue neutrality of the reproduction. After achieving reasonable neutrality, the operator will adjust for good tone reproduction (i.e., good light-to-dark progression, contrast, and absence of abrupt density changes between density steps). Finally, the operator will check and adjust for neutrality again, all this in an iterative procedure until satisfied with the overall resultant reproduction quality. The setup inevitably involves compromises over all the color areas in the print, and even a highly skilled operator may be unable to achieve acceptable color reproduction within a reasonable time period.

Color copiers and printers are known which include automatic setup means for adjusting one or more of the process control parameters affecting the output color and density. Such automatic adjustment is typically based on density measurements of toned test patches for each color separation independently of the other color separations. However, the human observer is critical not only to the appearance of individual colored areas taken individually, but also judges overall color and tone scale quality by the relationship of one color to another. For example, a slight hue error might be acceptable if the error is uniform over the entire image, but it would be unacceptable if the error is either (1) in one direction in some colors and in another direction in other colors or (2) in one direction for some densities and in another direction for other densities of the same color.

Many automatic systems that adjust process control parameters are responsive to a set of density steps developed on the photoconductive receiver and read by a transmission or reflection densitometer. Alternatively, reflection density steps transferred onto copy paper may be used as the control variable. Only a very small number of density step levels can be sampled relative to the number of gray levels available in, say, a seven bit, 128 step system. Therefore, at least some of the samples will not be at the most desirable density. As such, the error will not be reducible to zero, and the visual effect will not be best.

Different points on the density curve actually have different visual importance to the human eye, which does not respond linearly to density changes. For example, a given variation in density from a desired value will have a much larger effect at a lower density than that at higher density. It has been suggested to calculate process control parameter adjustments utilizing known average human relative visual sensitivities to density and color shifts at various density levels, and to more heavily weight those colors or densities which are particularly important to the scene; See commonly assigned, copending U.S. patent application Ser. No. 189,091, filed on May 2, 1988, in the name of A. Rushing now U.S. Pat. No. 4,853,738 which issued on Aug. 1, 1989.

While the appearance of related colors is strongly dependent on their relative densities, a uniform linear scale of relative densities between two low density samples is much greater than that between two high density samples.

DISCLOSURE OF INVENTION

While the human eye does not respond linearly to density (or luminance) changes, it does respond linearly to changes in lightness L*. Equal increments on the L* scale do represent approximately equal steps in the perceived lightness of related color space. Near uniform color scales are available wherein equal differences in the color co-ordinates correspond to roughly equal visual differences. Accordingly, the present invention proposes a visual-based process control method which operates in a near uniform human visual response space rather than in density space. On the average, this gives a better control for minimizing error in the human visual space than if the density space is used.

According to one aspect of the present invention, an image reproduction device includes apparatus for automatically adjusting process control parameters to achieve reproductions in terms of human visual response. The apparatus comprises means for making a plurality of density measurements across a range of densities and for converting the density measurements to a near uniform human visual space. A set of error signals are calculated for the converted density measurements in accordance with human visual sensitivities of said near uniform human visual space, and a set of process control parameter adjustment signals are calculated in response to the set of error signals so as to minimize a performance index which is a function of said error signals. The process control parameters are adjusted in response to the set of parameter adjustment signals to influence reproduction.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 13 is a density to L*, a*, b* conversion table for that set of cyan toner;

FIG. 14 is a table of selected densities and weighting factors; and

BEST MODE FOR CARRYING OUT THE INVENTION

The present invention is described below in the environment of an electrophotographic copier. At the onset, it will be noted that although this invention is suitable for use with such machines, it also can be used with other types of electrostatographic copiers and printers.

For a detailed explanation of the theory of copier contrast and exposure control by controlling initial voltage $V_O$, exposure $E_O$, and development bias $V_b$, reference may be made to the following article: Paxton, Electrophotographic Systems Solid Area Response Model, 22 Photographic Science and Engineering 150 (May/Jun. 1978).

Figure 1:
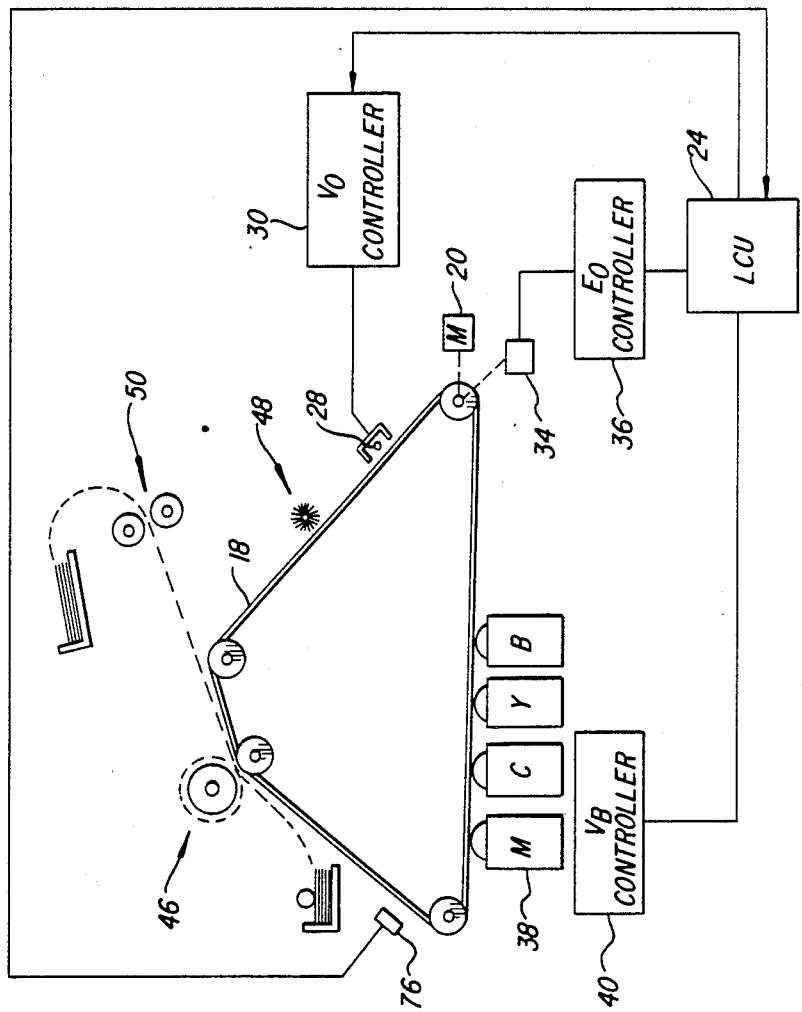
FIG. 1 is a schematic showing a side elevational view of an electrostatographic machine in which the present invention is useful.

Referring to FIG. 1, a moving transfer member such as photoconductive belt 18 is driven by a motor 20 past a series of work stations of the printer. A logic and control unit (LCU) 24, which has a digital computer, has a stored program for sequentially actuating the work stations.

For a complete description of the work stations, see commonly assigned U.S. Pat. No. 3,914,046. Briefly, a charging station 28 sensitizes belt 18 by applying a uniform electrostatic charge of predetermined primary voltage $V_O$ to the surface of the belt. The output of the charger is regulated by a programmable controller 30, which is in turn controlled by LCU 24 to adjust primary voltage $V_O$.

At an exposure station 34, projected light from a write head dissipates the electrostatic charge on the photoconductive belt to form a latent image of a document to be copied or printed. The write head preferably has an array of light-emitting diodes (LED's) or other light source for exposing the photoconductive belt picture element (pixel) by picture element with an intensity regulated by a programmable controller 36 as determined by LCU 24. Alternatively, exposure may be by means of optical projection of light reflected from an original document.

Travel of belt 18 brings the areas bearing the latent charge images into a development station 38. The development station has a magnetic brush for each color toner in juxtaposition to, but spaced from, the travel path of the belt. Magnetic brush development stations are well known. For example, see U.S. Pat. No. 4,473,029 to Fritz et al and 4,546,060 to Miskinis et al.

LCU 24 selectively activates the development station in relation to the passage of the image areas containing latent images to selectively bring the magnetic brush into engagement with the belt. The charged toner particles of the engaged magnetic brush are attracted to the oppositely charged latent imagewise pattern to develop the pattern.

As is well understood in the art, conductive portions of the development station, such as conductive applicator cylinders, act as electrodes. The electrodes are connected to a variable supply of D.C. potential $V_b$ regulated by a programmable controller 40.

A transfer station 46 and a cleaning station 48 are both fully described in commonly assigned U.S. patent application Ser. No. 809,546, filed Dec. 16, 1985, now abandoned. After transfer of the unfixed toner images to a receiver sheet, such sheet is transported to a fuser station 50 where the image is fixed.

Logic and Control Unit (LCU)

Programming commercially available microprocessors is a conventional skill well understood in the art. The following disclosure is written to enable a programmer having ordinary skill in the art to produce an appropriate control program for such a microprocessor. The particular details of any such program would depend on the architecture of the designated microprocessor.

Figure 2:
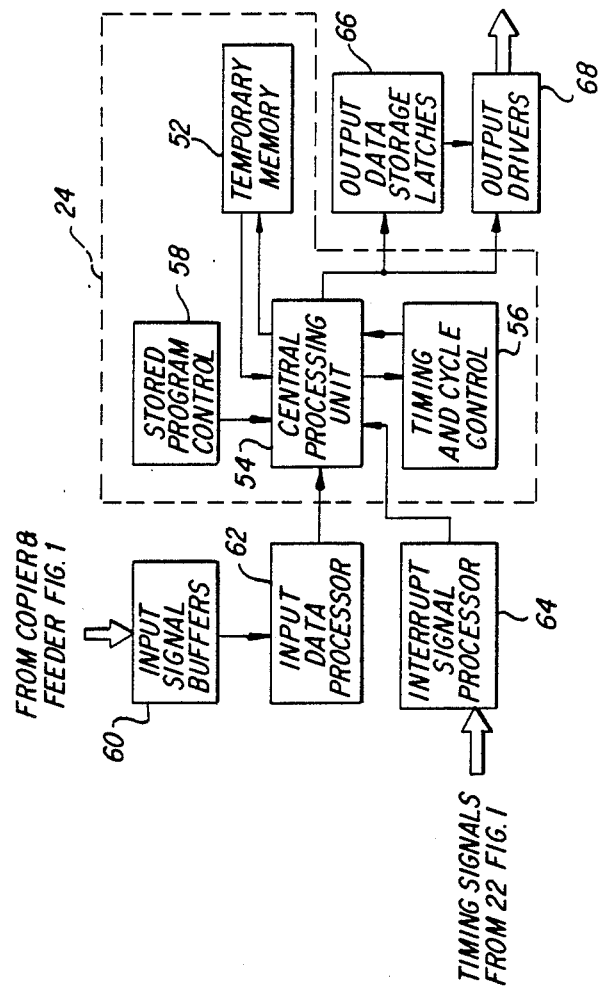
FIG. 2 is a block diagram of the logic and control unit shown in FIG. 1.

Referring to FIG. 2, a block diagram of a typical LCU 24 is shown. The LCU consists of temporary data storage memory 52, central processing unit 54, timing and cycle control unit 56, and stored program control 58. Data input and output is performed sequentially under program control. Input data are applied either through input signal buffers 60 to an input data processor 62 or through an interrupt signal processor 64. The input signals are derived from various switches, sensors, and analog-to-digital converters.

The output data and control signals are applied directly or through storage latches 66 to suitable output drivers 68. The output drivers are connected to appropriate subsystems.

Feedback Control

Process control strategies generally utilize various sensors to provide real-time control of the electrostatographic process and to provide "constant" image quality output from the user's perspective.

One such sensor may be a densitometer 76 (FIG. 1) to monitor development of test patches on the photoconductive belt 18, as is well known in the art. The densitometer may consist of an infrared LED which shines through the belt or is reflected by the belt onto a photodiode. The photodiode generates a voltage proportional to the amount of light received. This voltage is compared to the voltage generated due to transmittance or reflectance of a bare patch, to give a signal representative of an estimate of toned density.

Figure 3:
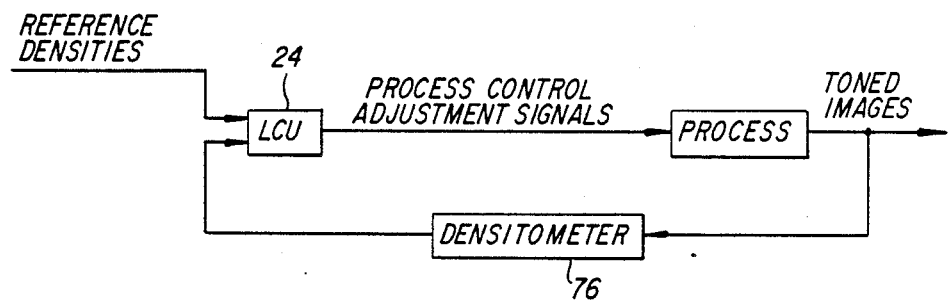
FIG. 3 is a block diagram of the system for effecting the color quality improvements in accordance with the present invention.
Figure 4:
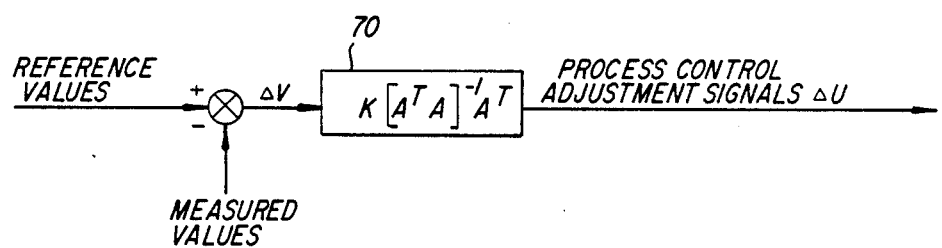
FIGS. 4 and 5 are functional block diagrams showing computations used in accordance with the present invention.
Figure 5:
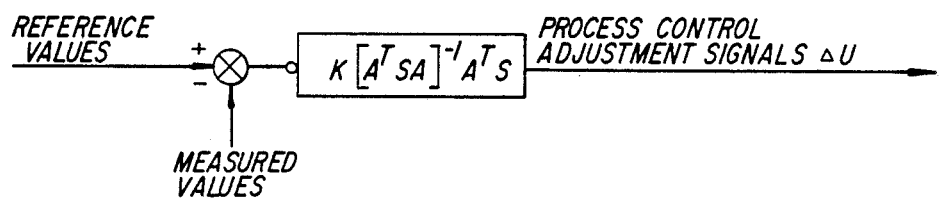

Referring to FIG. 3, LCU 24 receives signals from densitometer 76, and calculates process control parameter adjustment signals to minimize a preferred performance index. The performance index is a positive function of the errors, and might be chosen to minimize average absolute error, sum of absolute cubed errors, sum of absolute errors, sum-of-squared errors, etc. For example, a process control parameter adjustment signal calculation which drives the errors toward a minimum sum-of-squares, i.e., a quadratic performance index is shown in FIG. 4. A controller 70 calculates a process control parameter adjustment vector "$\Delta U$" by multiplying an error vector by $K[A^T A]^{-1} A$, where "T" denotes the matrix transpose operation and the "A" matrix is the empirical linearized relationship in the copier or printer which describes how small changes in the manipulated process control parameters affect a measured value of the toned test patches. That is, the "A" matrix is the relationship between process control parameter adjustment vector "$\Delta U$" and the error such that:

$$[error] = -[A][\Delta U] \quad (1)$$

The use of a quadratic performance index helps minimize the effect of neglecting the higher order (nonlinear) terms in the true relationship between the error and $\Delta U$. For example, if there are five test patches and only two adjustable process control parameters available (i.e. $V_O$ and $E_O$), equation (1) has the following "A" matrix characterization for each color separation:

$$\begin{bmatrix} error_1 \\ error_2 \\ error_3 \\ error_4 \\ error_5 \end{bmatrix} = - \begin{bmatrix} a_{11} & a_{12} \\ a_{21} & a_{22} \\ a_{31} & a_{32} \\ a_{41} & a_{42} \\ a_{51} & a_{52} \end{bmatrix} \times \begin{bmatrix} \Delta V_0 \\ \Delta E_0 \end{bmatrix} \quad (2)$$

The sum-of-squares (quadratic) performance index to be minimized in FIG. 4 is given by:

$$J = [error]^T [error] = (error_1)^2 + (error_2)^2 + \ldots + (error_5)^2 \quad (3)$$

Since equation (2) represents an underdetermined system, it is generally not possible to drive all the steps to arbitrary desired density levels of the measured value, i.e., to force performance index J equal to zero in equation (3). However, the pseudo-inverse operation of equation (4) below gives the adjustments which will, in principle, reduce the measured deviations to a minimum in a least squares sense, i.e., make "J" equal "$J_{min}$".

$$\begin{bmatrix} \Delta V_0 \\ \Delta E_0 \end{bmatrix} = [A^T A]^{-1} A^T \begin{bmatrix} error_1 \\ error_2 \\ error_3 \\ error_4 \\ error_5 \end{bmatrix} \quad (4)$$

The measurement and adjustment procedure indicated in FIG. 4 can be repeated, i.e., iterated, as many times as necessary to converge toward the desired result. Successive adjustments would be computed after the effects of the previous adjustments are detected in the measurements.

Scalar K in FIG. 4 is a value between zero and one, selected large enough for reasonably fast convergence of the iterations toward the minimum sum of squares, and small enough for good robustness with respect to modelling errors in the "A" matrix and disturbances. Modelling errors would include, for example, the error of representing the inherently nonlinear process by linear equation (1), as well as drift of the true "A" matrix over time. Disturbances would include stray light, line voltage fluctuations, photoconductor wear, and environmental effects which influence the output density.

Figure 6:
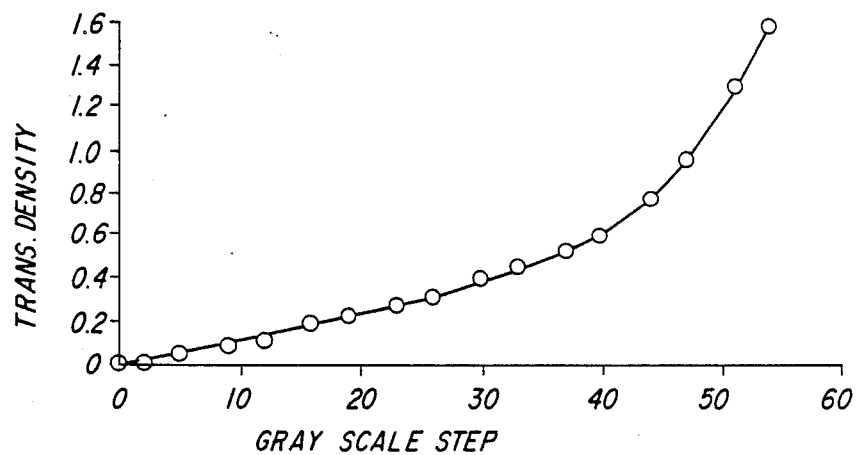
FIG. 6 is a graph of transmission density vs. halftone gray level steps.
Figure 7:
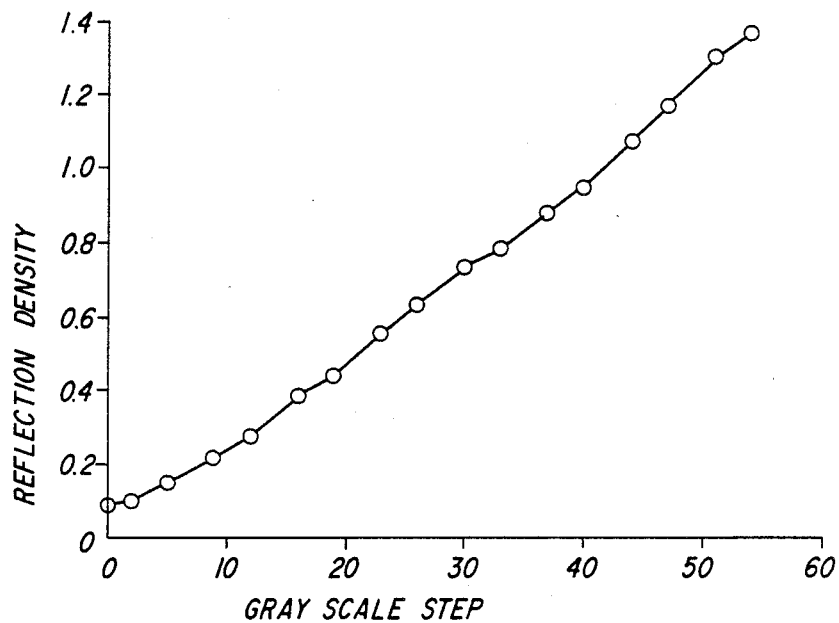
FIG. 7 is a graph of transferred reflection density vs. halftone gray level steps.
Figure 8:
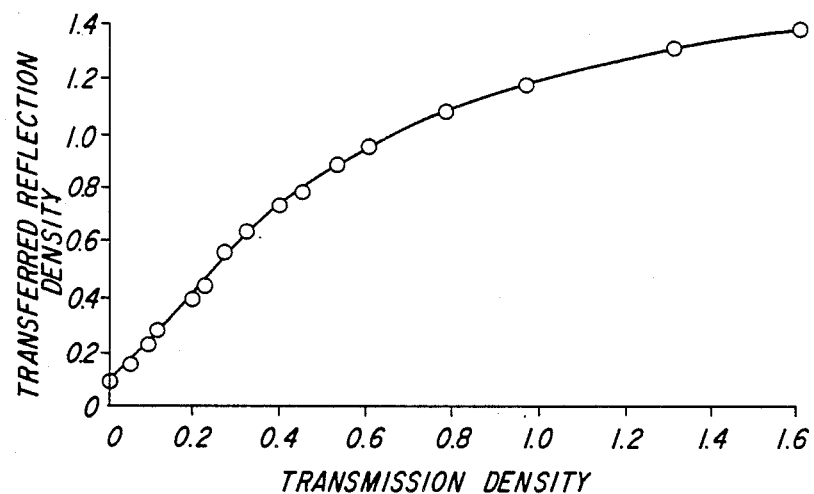
FIG. 8 is a graph of transferred reflection density vs. transmission density.

FIG. 6 shows a typical achromatic transmission density vs step number of an electronically generated three bits per pixel gray level halftone screen. FIG. 7 shows the reflection achromatic density vs the gray level step number for the same halftone as in FIG. 6 after the image has been transferred and fused onto paper. Therefore, by measuring the transmission density on the film, one can determine what the reflection density will be after transfer to paper, given a pre-defined process of transfer and fusing, as shown in FIG. 8. Therefore any deviation of measured transmission density can be related to the reflection density for that particular process.

One can relate the achromatic reflection density "D" to a more uniform human visual space like lightness L* by equations like $$L^* = 116(100^{-D}/Y_o)^{\frac{1}{3}} - 16 \quad (5)$$

where $Y_o$ is the luminance of the reference white.

Figure 9:
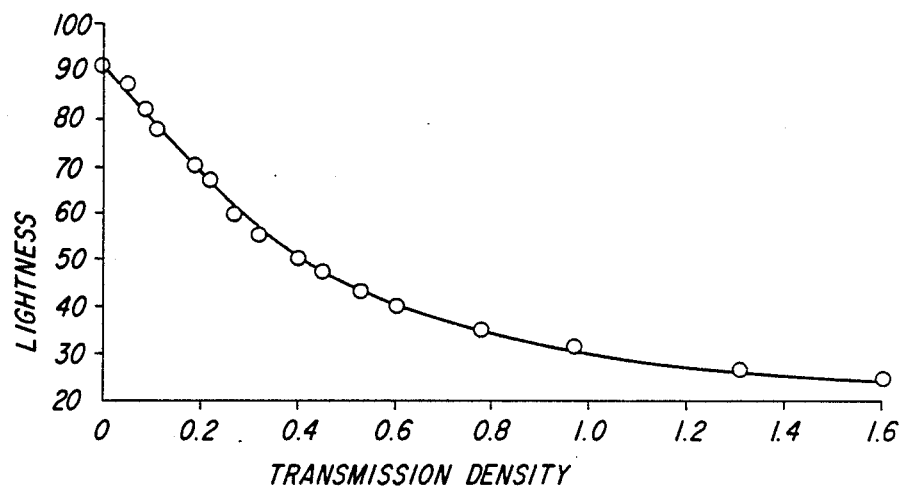
FIG. 9 is a graph of lightness vs. transmission density.

By combining the graph of FIG. 8 and equation (5), we in fact can relate the measured transmission density to a more visual based system like lightness as shown in FIG. 9. The slope of the curve in FIG. 9 is the rate of change of lightness vs transmission density $dL/dD_{tran}$ at the transmission density of choice. If several transmission densities are measured, and the error from desired densities are determined, the normalized slope of the lightness-to-density curve of FIG. 9 can be used as a weighting factor in adjusting the electrostatographic process. That is, the weighting factor for any transmission density will be the value $dL/dD_{tran}$ at that density normalized with respect to the density which has the highest $dL/dD_{tran}$ value.

For example, a density error of 0.1 at a measured density 0.2 has a higher slope (and weighting factor) than a 0.1 density error at a measured density of 1.0. Thus, the density is converted with the weighting factor into a human visual space so that when the process control parameters are adjusted to minimize a performance index, the adjustment calculation is conducted in the state that is most beneficial to the human observer, and more correction in terms of density is done in the regions where lightness error is greatest.

Figures 10, 11, 12:
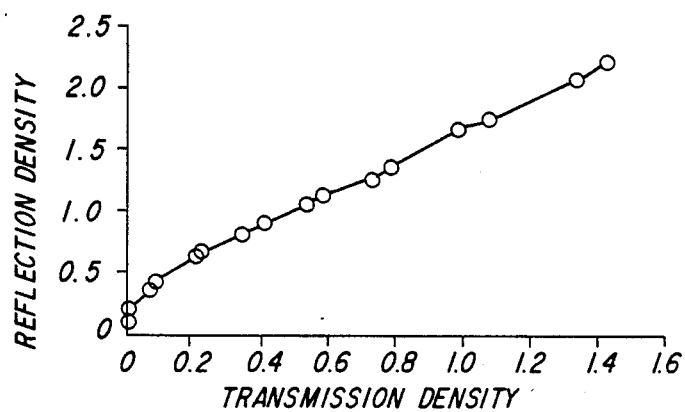
FIG. 10 is a table of selected densities and weighting factors.
FIG. 11 is a table of selected densities and weighting factors.
FIG. 12 is a graph of transferred and fused reflection density vs. transmission density for Cyan toner.

The table of FIG. 10 demonstrates this weighting factor concept. In this case the reflection density of output copies or prints was used rather than the transmission density. That is assuming a reflection densitometer is used on the output copy for measurement. Picking a few of the density gray level steps $D_{ref}$ at random, their rates of change of lightness vs reflection density $dL/dD_{ref}$ have been calculated, as have their relative weighting factors normalized so that the highest weighting factor is normalized to one. Note that for high density steps, the weighting factor is less than for low density steps.

While the density gray level steps of FIG. 10 were chosen at random, a better selection of steps for the purpose of process control would be distributed more uniformly in the lightness space, as shown in FIG. 11 for a selected $D_{max}$ of 1.85 and a $D_{min}$ of 0.08. In other words, the patch densities chosen are picked such that they are substantially equally incremented in the lightness space. The weighting factor for paper base (0.08 $D_{ref}$) is normalized to 1.0. Therefore, say at 1.35 density, the normalized weighting factor is 0.377. Note that this is a highly non-linear result.

Once the normalized weighting factors have been determined, measured density errors can be modified by the weighting factor of that density before process control corrections are made so that the corrections minimize the errors in the lightness space (or other near uniform human visual space) rather than in the density space. A similar concept can be applied in the transmission density if a transmission densitometer is used. One can simply use the slope of the curve in FIG. 9 at the lightness value of choice as the weighting factor and choose the transmission density steps that will create the lightness of choice as the test steps.

In color space, convenient lightness L* is not useful. Still, the achromatic method discussed above can be extended to include chromatic systems like that for cyan toner shown in FIG. 12, wherein a measured principal reflection density for cyan toner is plotted against measured principal transmission density. The measured principal reflection density of color toners can be related with co-ordinates of a near uniform color space wherein equal differences in the co-ordinates correspond to roughly equal visual differences.

For example, commonly used near uniform color spaces include CIELUV and CIELAB, that is L*,u*,v* and L*,a*,b* spaces. The table shown in FIG. 13 includes the L*,a*,b* co-ordinates for selected densities as determined via a calibration look-up table. Each color separation density test patch has an L*,a*,b* number which describes where that patch is on the color space. If the actual test patch has L*,a*,b* co-ordinates different from the intended coordinate values by an amount equal to $\Delta L^*$, $\Delta a^*$, and $\Delta b^*$, respectively, then the total color error is called $\Delta E^*$. In a near uniform color space, a color error $\Delta E^*$ in one principal density region appears the same to an observer as the same $\Delta E^*$ in another principal density region.

Since L*,a*,b* values are independent of each other, one can calculate the change in color error at a selected principle reflection density from the following equation:

$$\frac{dE^*}{dD_{ref}} = \left[ \left[ \frac{dL^*}{dD_{ref}} \right]^2 + \left[ \frac{da^*}{dD_{ref}} \right]^2 + \left[ \frac{db^*}{dD_{ref}} \right]^2 \right]^{\frac{1}{2}} \quad (2)$$

where $dE^*/dD_{ref}$ is the magnitude of the gradient of the color error in L*,a*,b* color space at a certain reflection density $D_{ref}$ (or from another point of view, it is the color error caused by a change in L*,a*,b* co-ordinates of a measured value from its desired value as a function of $D_{ref}$).

One can approximate a weighting factor from magnitude $dE^*/dD_{ref}$ by assuming the highest change is at the lowest $D_{ref}$ and setting that to one. The other data points are then normalized with respect to the first data point as shown in FIG. 14. Accordingly, for a principal cyan density of 0.08 (paper base), the weighting factor is normalized to 1.0. Therefore at a reflection cyan principal density of 1.0, the weighting factor is 0.357. This can be extended backward towards the principal transmission density via FIG. 12, which provides the slope $dD_{ref}/dD_{trans}$.

The same concept can be extended to other color toners. Then a process control scheme can be designed calling for minimizing the difference between the measured density and the desired density using the proper weighting factor correction. Since one may have more than three data points but only three control parameters (i.e., $V_O$, $E_O$ and $V_b$), the error sometimes cannot be adjusted to zero, and the error over the whole density scale may have to be minimized by the weighting factors such as by adjusting, for example, to a minimum standard deviation performance index.

Figure 15:
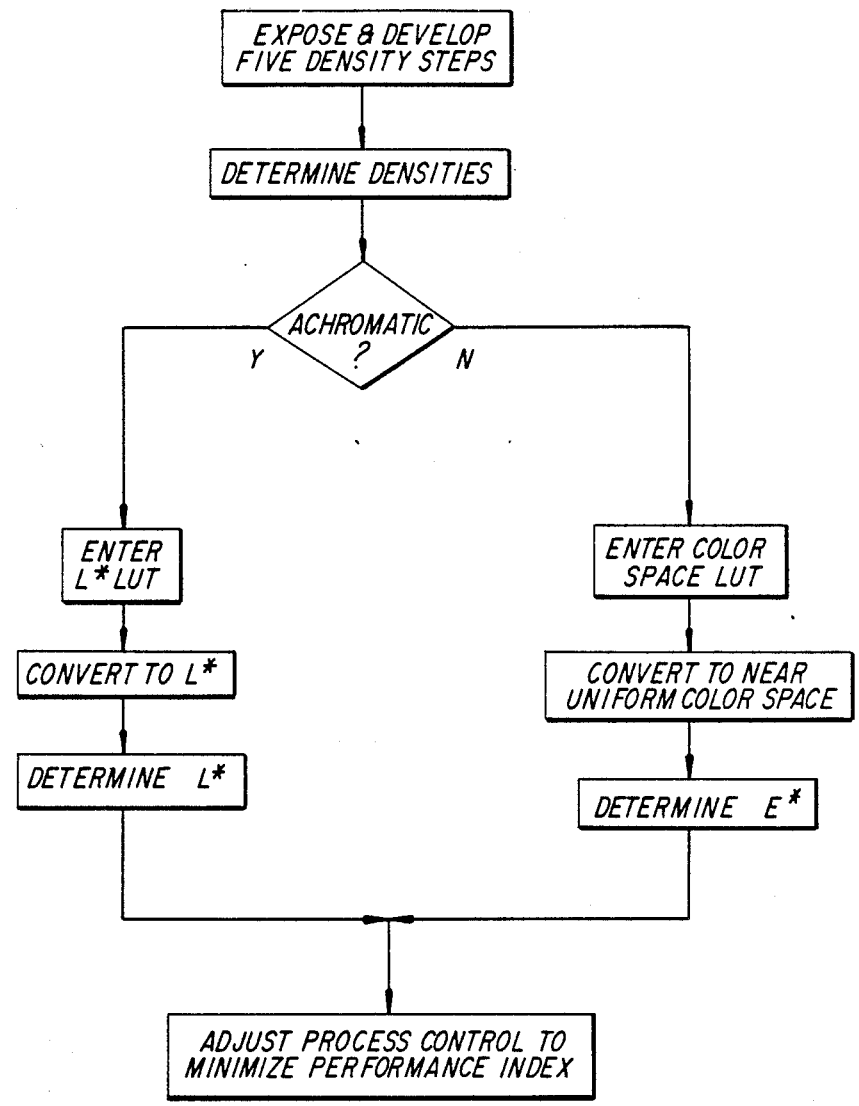
FIG. 15 is a flow chart for one embodiment of the present invention.

The above analysis assumes that a positive deviation from a desired density will have the same weighting factor as a negative deviation from the same desired density. A better method, using a look-up table approach, is explained in FIG. 15. In this example five density test patches are exposed and developed on the photoconductive receiver. The transmission density of each patch is determined. In an achromatic case, the transmission density acts as a pointer towards a lightness look-up table.

For color systems, the color error is determined by a translation look-up table that converts from principal transmission density to a near uniform color space such as L*,u*,v* or L*,a*,b*. Linear interpolation may be used in conjunction with the look-up table. Then the actual measured L*,u*,v* or L*,a*,b* co-ordinates are compared to intended coordinates and the color error $\Delta E^*$ is determined for each density step, providing a number for each step weighted in near uniform color space. The weighted error values are used to determine a process control parameter adjustment signal necessary to minimize a performance index. Finally the process parameters ($V_O$, $E_O$, and $V_b$) are adjusted for all the density steps to minimize the performance index based on the color error.

During the adjustments, changes can now be made to the most desirable parameter. For example, in one case at a particular density step, it might be more effective to use, say, initial voltage $V_O$ rather than exposure or toning bias. If so, $V_O$ will have the highest $\Delta E^*$. At other densities, exposure E or toning bias $V_b$ might have the greatest $\Delta E^*$. Thus, the time to reach convergence to the least error in terms of $\Delta E^*$ is minimized.

The invention has been described in detail with particular reference to preferred embodiments thereof, but it will be understood that variations and modifications can be effected within the spirit and scope of the invention.

What is claimed is:

1. In an image reproduction device, apparatus for automatically adjusting process control parameters to achieve reproductions in terms of human visual response; said apparatus comprising:
   means for producing reproductions;
   means for making a plurality of density measurements across a range of densities;
   means for converting the density measurements to a near uniform human visual space;
   means for calculating a set of error signals for the converted density measurements in accordance with human visual sensitivities of said near uniform human visual space;
   means responsive to said set of error signals for calculating a set of process control parameter adjustment signals to minimize a performance index which is a function of said error signals; and
   means responsive to said set of parameter adjustment signals for adjusting process control parameters to influence reproduction.

2. Apparatus as defined in claim 1 wherein said converting means comprises means for converting a predetermined number of selected densities to a near uniform human visual space such that said selected densities are distributed substantially uniformly in the near uniform human visual space between maximum and minimum densities of interest.

3. Apparatus as defined in claim 2 wherein said near uniform human visual space is lightness.

4. Apparatus as defined in claim 2 wherein said near uniform human visual space is $L^*,a^*,b^*$.

5. Apparatus as defined in claim 2 wherein said near uniform human visual space is $L^*,u^*,v^*$.

6. Apparatus as defined in claim 1 wherein said calculating means is adapted to normalize the error signal.

7. Apparatus as defined in claim 1 wherein said calculating means is adapted to normalize the error signal such that the highest error signal is normalized to one.

8. In a color image reproduction device, apparatus for automatically adjusting process control parameters for a plurality of color separations to achieve reproductions in terms of human visual response; said apparatus comprising:
   means for producing reproductions;
   means for making a plurality of density measurements across a range of densities for each color separation;
   means for converting the density measurements to a near uniform color space;
   means for calculating a set of error signals for the converted density measurements in accordance with human visual sensitivities of said near uniform color space;
   means responsive to said set of error signals for calculating a set of process control parameter adjustment signals to minimize a performance index which is a function of said error signals; and
   means responsive to said set of parameter adjustment signals for adjusting process control parameters to influence reproduction.

9. Apparatus as defined in claim 8 wherein said converting means comprises means for converting a predetermined number of selected densities to a near uniform color space such that said selected densities are distributed substantially uniformly in the near uniform color space between maximum and minimum densities of interest.

10. Apparatus as defined in claim 9 wherein said near uniform color space is $L^*,a^*,b^*$.

11. Apparatus as defined in claim 9 wherein said near uniform color space is $L^*,u^*,v^*$.

12. Apparatus as defined in claim 8 wherein said calculating means is adapted to normalize the error signal.

13. Apparatus as defined in claim 8 wherein said calculating means is adapted to normalize the error signal such that the highest error signal is normalized to one.

14. A system for adjusting process control parameter in an electrostatographic machine, said system comprising:
   means for producing a plurality of different density test patches;
   means for making density measurements of said test patches;
   means for converting the measured densities to a visual based system;
   means for determining the error between the converted density signals and a set of desired values; and
   means for adjusting the electrostatographic process in accordance with the determined error.

15. The system defined in claim 14 wherein the visual based system is lightness.

16. The system defined in claim 14 wherein the density measurements are made at densities distributed substantially equally in the visual based system.

17. A system for adjusting process control parameter in a color electrostatographic machine, said system comprising:
   means for producing a plurality of different density test patches for each color;
   means for making density measurements of said test patches;
   means for converting the measured densities to a near uniform color space wherein equal differences in the color co-ordinates correspond to roughly equal visual differences;
   means for determining the error between the converted density color co-ordinates and a set of desired co-ordinates; and
   means for adjusting the electrostatographic process in accordance with the determined error.

18. The system defined in claim 17 wherein the visual based system is $L^*,a^*,b^*$ color space.

19. The system defined in claim 17 wherein the visual based system is $L^*,u^*,v^*$ color space.

20. The system defined in claim 17 wherein the density measurements are made at densities distributed substantially equally in the visual based system.

21. The system defined in claim 17 wherein said converting means is a look-up table.

* * * * *